Nov. 23, 1926.  1,608,382
H. C. FOX
TRANSMISSION GEAR SHIFTING ATTACHMENT
Filed August 17, 1926
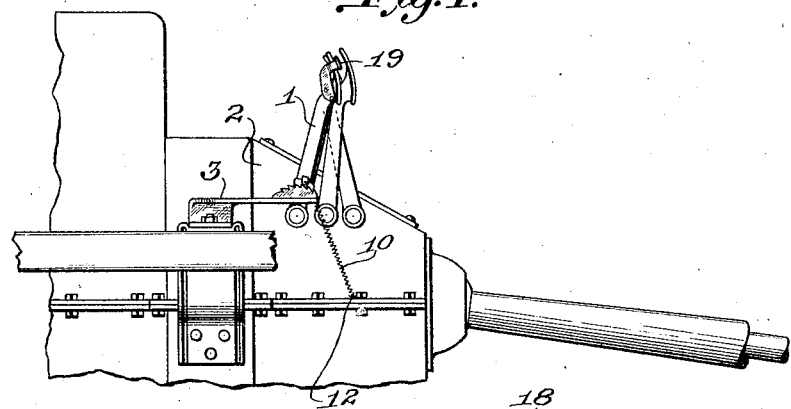
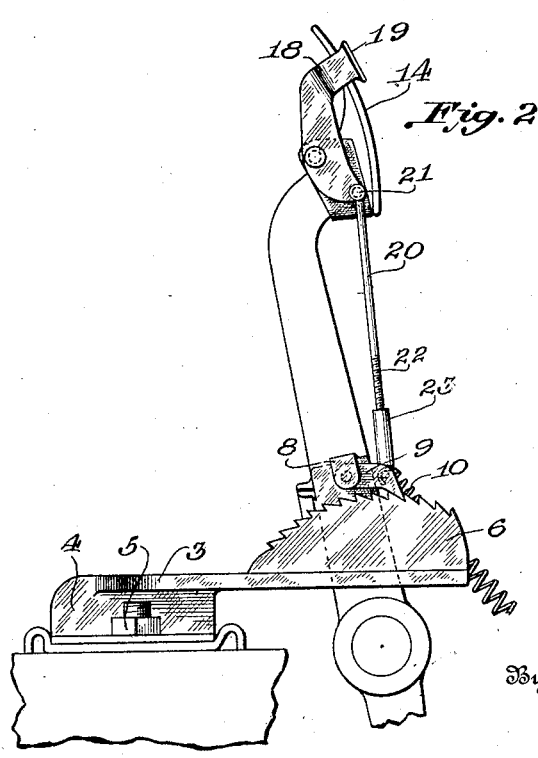
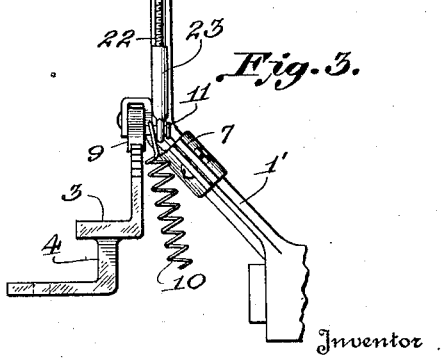
Inventor
Harold C. Fox.
By William C. Linton
Attorney Patented Nov. 23, 1926.

1,608,382

UNITED STATES PATENT OFFICE.

HAROLD C. FOX, OF ESTHERVILLE, IOWA.

TRANSMISSION-GEAR-SHIFTING ATTACHMENT.

Application filed August 17, 1926. Serial No. 129,802.

This invention relates to improvements in transmission gear shifting attachments, and especially to an attachment for those types of variable speed transmissions wherein the changing of speed ratios is adapted to be effected by a foot pedal, the pedal being pushed inwardly to effect a low speed drive and permitted to move outwardly to effect a high speed drive, the invention having for an object to provide a novel means whereby, with inward moving of the gear shift pedal, the same will be automatically caused to temporarily remain in such inward or depressed position, thus establishing and maintaining a low speed drive for a prolonged period of time without the necessity of the operator holding his foot upon the pedal or the giving of further attention thereto.

It is also an object of the invention to provide an attachment of the character mentioned wherein an auxiliary pedal is mounted upon the gear shift pedal in such a manner as to permit of its engagement and operation during the placing of the operator's foot thereon in a normal or usual manner, whereby the pedal temporary locking means will remain inactive, but with engagement of the foot with the pedal in a slightly abnormal but convenient manner, the auxiliary pedal will not be engaged and by consequence, will cause said temporary locking means to function in a manner to retain the gear pedal in an inward position when depressed, so as to prolong the establishment of a low speed drive.

Another and equally important object of the invention may be stated to reside in the provision of a gear shift pedal attachment whose construction is such that the same may be attached to the standard form of pedal now used upon variable speed transmissions, and especially, the transmissions of the Ford design of motor driven vehicles, without alteration or modification thereto and which, when attached, will not in any way whatsoever interfere with normal usage or operation of the equipped pedal.

Among other aims and objects of the invention, there may be noted the provision of a device of the character mentioned simple and durable in construction, capable of manufacture at a minimum cost and which can be attached or installed upon a gear shift pedal of a variable speed transmission gearing with but small labor outlay.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

In these drawings:

Figure 1 is a fragmentary side elevation of a variable speed power transmission, herein of the planetary type wherein the speed ratios are adapted to be established by means of a foot pedal, Figure 2 is an enlarged fragmentary detail side elevation of the particular gear shift pedal employed upon the transmission showing the invention attached thereto, and Figure 3 is a front elevation, partly in section, showing the attachment of the invention to the gear shift pedal and the arrangement of the foot engaging means of the auxiliary pedal with the foot engaging means (shown in dotted lines) of the gear shift pedal.

Having more particular reference to the drawings, in connection with which like characters of reference will designate corresponding parts throughout, it may be stated for convenience and clarity hereinafter, that the improved attachment is adapted to be installed upon that type of variable speed power transmission wherein a foot pedal 1 serves as the means for effecting and establishing the desired speed ratios or drives, such pedal, as is usual in constructions of this character, being pivotally mounted upon an appropriate portion of the casing of the power transmission, designated at this time by the numeral 2. In variable speed power transmissions of this particular type, it is usual that an operator, to effect a low speed drive, forces inwardly or depresses the pedal 1 to its full extent of movement, thus establishing a low speed drive. When the purpose of this low speed drive has been served, the operator then to effect a high speed drive releases the pedal 1, permitting it to move outwardly to its full limit of movement in this particular direction, whereupon the said high speed drive will have been effected. Thus, it will be appreciated that to maintain a low speed drive through the power transmission equipped with the pedal 1, it is necessary that the operator keep his foot upon the pedal whereby the same will be maintained in its inward or depressed position. Such a procedure, especially where a low speed drive must be maintained for a prolonged rate of time, is annoying and inconvenient to an operator and it is with these ends in view that I have conceived my improved attachment, such attachment functioning as a means for effectually and practicably retaining the gear shift pedal 1 in its depressed or inward position when once moved to such position, without the necessity of the operator holding his foot upon such pedal or paying further attention thereto, other than to operate the attachment to permit of return of the equipped foot pedal 1 to its outward position when the low speed drive has served its purpose.

With the above in view, the invention may be stated to comprise a bracket arm 3 formed with a right angularly disposed basal portion 4 adapted to be bolted to a convenient portion of the variable speed transmission bed or frame as is indicated by the numeral 5. A segmental ratchet 6 is fixedly carried upon the outer or free end of this arm 3 and serves for a purpose which will be subsequently described. In this connection, it will be noted upon reference to the Figures 1 and 2 that the ratchet 6 carried upon the free extremity of the bracket arm 3 is vertically disposed and is arranged at a point in proximity to the basal portion of the gear shift pedal 1.

It is to be noted that the lower or basal portion of the gear shift pedal 1 is offset as indicated by the numeral 1' and to this offset portion 1', I attach a clamping bracket 7, forming integral with one side thereof, a substantially inverted U-shaped bearing bracket 8 having a pawl 9 pivotally mounted therein, as is shown in the Figure 2, the bit end of said pawl being downwardly disposed and adapted to be engaged in a sequential fashion with the series of ratchet teeth the plate 6, aforesaid. That the pivoted pawl 9 may be normally placed under a tension sufficient to cause the bit portion thereof to engage with the teeth upon the ratchet plate 6, a contractile coiled spring 10 is provided, one end thereof being connected to a pin 11 extended from the adjacent side and portion of said pawl 9 whereas the opposite end of said spring is connected to a convenient fixed point upon the transmission casing, as is indicated by the numeral 12.

With a view toward providing the attachment with means whereby said pawl 9 may be rendered inactive or inoperative, at times, I provide a second clamping bracket 13, said bracket embracingly engaging the upper and offset end of the foot pedal 1 directly adjacent and rearwardly of the foot engaging portion 14 thereof, as is shown in the Figure 2, providing a clamping bolt 16 of a length such as will permit the same to also serve as a means for pivotally mounting an auxiliary pedal or lever 17 upon said bracket 13.

This auxiliary pedal 17 has the upper portion thereof offset as is indicated by the numeral 19 and upon the free extremity of said offset portion a foot engaging means 19 is fixedly mounted, it being noted in this connection, that such means 19 is disposed adjacent one side portion of the foot engaging means 14 of the gear shift pedal 1, so that the former may be conveniently engaged when the operator of a vehicle equipped with the transmission places his foot upon such engaging means 14 in a usual or normal manner.

A connecting link 20 is pivoted to the lower end of the auxiliary pedal 17 as indicated by the numeral 21 and the lower portion of this link is screw threaded as at 22 whereby the same may be turned into engagement with an internally screw threaded sleeve 23 or turnbuckle, which in turn, is pivotally connected to the adjacent portion of the pin 11 carried upon the pawl 9. Thus, with engagement of the screw threaded end 22 of the connecting link in the sleeve 23, an adjustable connection will have been effected as between said pawl 9 and the auxiliary pedal 17.

In operation of my improved attachment, it will be understood that because of the construction and positioning of the auxiliary pedal 17 with respect to the foot engaging means 14 of the gear shift pedal 1, with the placing of an operator's foot upon said engaging means 14 in a normal or usual fashion, a portion of the foot will engage the engaging means 19 of said pedal 17, depressing the same and causing an upward pull to be imparted to the connecting link 20, thus moving the pawl 19 against the tension of the contractile spring 10 to its inoperative or abnormal position. With the pawl 9 so disconnected, it will be understood that an operator may depress the gear shift pedal 1 to its full extent whereby to effect establishment of a low speed drive and in so long as his foot remains upon the engaging means 14 and the engaging means 19 of the auxiliary pedal 17, said pawl 9 will be retained in its inoperative position with respect to the teeth upon the ratchet 6, so that the gear shift pedal 1, when desired, may be permitted to move outwardly whereby to then establish a high speed drive. When, however, it is desired to establish a low speed drive for a prolonged period of time without the necessity of the operator keeping his foot upon the engaging means 14 of the pedal 1, the operator's foot is then placed upon said engaging means in a slightly abnormal but convenient manner, that is, in a manner whereby the foot will not engage or depress the engaging means 19 upon the auxiliary foot pedal 17. Thus, when the operator depresses the gear shift pedal 1, the pawl 9 will ride over the various ratchet teeth of the ratchet plate 6 until the foot pedal 1 has been depressed to that extent necessary to establish a low speed drive. At this time, the operator may remove his foot from the engaging means 14 of the gear shift pedal 1 and at such time, it will be understood that the pawl 9 will have engaged between adjacent teeth of the ratchet 6 and therefore, will serve to temporarily retain the foot pedal 1 in its depressed position for prolonging the low speed drive. When it is desired that the low speed drive shall be interrupted, the operator merely places his foot upon the engaging means 14 of the pedal 1 in a manner so as to engage the means 19 upon the auxiliary pedal 17, depressing such pedal to such an extent as to cause an upward pull upon the connecting link 20, thus disengaging the pawl 9 from the previously engaged ratchet 6. At such time, the foot pedal 1 may be freely moved outwardly to a position for establishing a high speed drive.

Manifestly, the construction shown is capable of considerable modification and such modification as is within the spirit of my claim, I consider within the scope of my invention.

I claim:

In combination with a gear shift pedal, an upper and lower clamp secured thereto, an auxiliary pedal pivoted to said upper clamp in a predetermined position relative to said gear shift pedal, a pawl pivoted to said lower clamp, a rack co-acting therewith, a link connected to said auxiliary pedal, a coil spring and a single pin connecting said spring, pawl and link together, said spring being arranged below said pawl.

In witness whereof I have hereunto set my hand.

HAROLD C. FOX.